United States Patent [19]

Hatanaka

[11] Patent Number: 5,761,699
[45] Date of Patent: Jun. 2, 1998

[54] SYSTEM FOR ADAPTING A COMPUTER SYSTEM TO DIFFERENT TYPES OF DATA STORAGE DISKS FOR INTERCHANGEABLE USE WITH A DISK DRIVE

[75] Inventor: Rieko Hatanaka, Tanashi, Japan

[73] Assignee: TEAC Corporation, Tokyo, Japan

[21] Appl. No.: 719,590

[22] Filed: Sep. 25, 1996

Related U.S. Application Data

[63] Continuation of Ser. No. 293,474, Aug. 19, 1994, abandoned.

[30] Foreign Application Priority Data

Aug. 20, 1993 [JP] Japan ................. 5-228170
Dec. 30, 1993 [JP] Japan ................. 5-350149

[51] Int. Cl.[6] .................................................. G06F 12/00
[52] U.S. Cl. ............................................ 711/101; 711/112
[58] Field of Search .............................. 395/428, 438, 395/439; 360/69, 75; 711/101, 111, 112

[56] References Cited

U.S. PATENT DOCUMENTS

| | | | |
|---|---|---|---|
| 4,514,771 | 4/1985 | Stark et al. | 360/73 |
| 4,644,418 | 2/1987 | Banno et al. | 360/39 |
| 4,644,419 | 2/1987 | Iinuma et al. | 360/46 |
| 4,656,533 | 4/1987 | Sakai et al. | 360/65 |
| 4,679,102 | 7/1987 | Wevers et al. | 360/75 |
| 4,724,493 | 2/1988 | Nakamura | 360/51 |
| 4,773,036 | 9/1988 | Berens et al. | 364/900 |
| 4,928,192 | 5/1990 | Bartlett et al. | 360/77.08 |
| 4,928,193 | 5/1990 | Agoglia et al. | 360/78.04 |
| 5,155,638 | 10/1992 | Aikawa et al. | 360/69 |
| 5,173,816 | 12/1992 | Ogihara | 360/69 |
| 5,293,625 | 3/1994 | Miura et al. | 395/500 |
| 5,577,234 | 11/1996 | Hanabusa et al. | 395/500 |
| 5,592,640 | 1/1997 | Minoura et al. | 711/101 |

*Primary Examiner*—Tod R. Swann
*Assistant Examiner*—Conley B. King, Jr.
*Attorney, Agent, or Firm*—Woodcock Washburn Kurtz Mackiewicz & Norris LLP

[57] ABSTRACT

A computer system has a host system and a disk drive external thereto. In order to adapt the disk drive to interchangeable use with two or more different types of disks such as double density disks and high density disks of both 1.25 and 1.44 megabyte capacities, the host system first determines which of the interchangeable types of disks is loaded in the disk drive. If a different operating mode such as a different disk speed proves necessary in the disk drive, the host produces a selected one of standard disk drive control signals in combination with a mode change command for multiplex transmission to the disk drive. No dedicated channel is therefore needed for sending the mode change command from the host to the disk drive. Stepping pulses are utilized in one embodiment for carrying the mode change command, in the form of consecutive stepping pulses, the number of which is greater than that required for moving the head across all the tracks on any of the interchangeable disks. Another embodiment employs a read gate signal which switches to a prescribed state with a predetermined time delay to denote the mode change command.

4 Claims, 15 Drawing Sheets

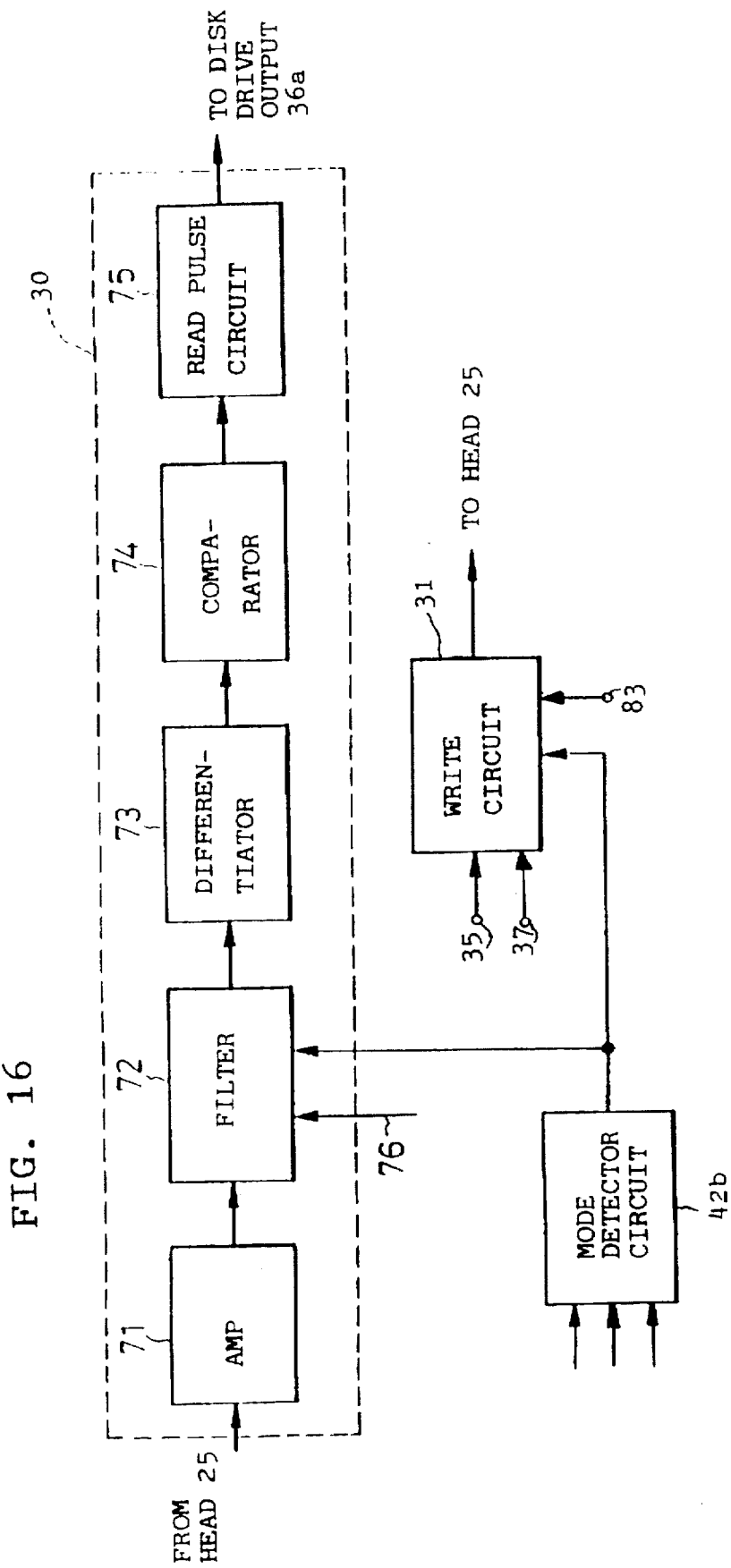

SYSTEM FOR ADAPTING A COMPUTER SYSTEM TO DIFFERENT TYPES OF DATA STORAGE DISKS FOR INTERCHANGEABLE USE WITH A DISK DRIVE

This is a continuation of U.S. application Ser. No. 08/293,474, filed on Aug. 19, 1994 entitled System for Adapting a Computer System to Different Types of Data Storage Disks for Interchangeable Use with a Disk Drive, now abandoned.

BACKGROUND OF THE INVENTION

This invention relates to computer systems, and more particularly to small computer systems comprising a host system and a peripheral device which is external thereto and which is interfaced therewith for use as external data storage means, the peripheral device being exemplified by a disk drive for use with flexible magnetic disks, or floppy disks according to common parlance. Still more particularly, the invention deals with such a computer system that can automatically handle such magnetic disks or other storage media that are the same in size but different in types such as densities or storage capacities.

Three and a half inch floppy disks commercially available today are broadly classifiable into a double sided, double density (2DD) version and a double sided, high density (2HD) one. However, on being formatted in personal computers, word processors, etc., which are manufactured by different companies in different countries, the 2DD disks offer the two different storage capacities of 640 and 720 kilobytes whereas the 2HD disks provide those of 1.25 and 1.44 megabytes.

Difficulties have been encountered in use of such disks of different densities and storage capacities. A majority of conventional disk drives for use with 2HD disks are capable of data transfer therewith only when they are formatted into either of the 1.25 and 1.44 megabytes capacities. Such disk drives can discriminate between 2DD and 2HD disks from their envelopes but not between the 2HD disks of 1.25 and 1.44 megabytes because they bear the same envelope. Triple mode disk drives have therefore been developed which have a mode select switch for rotating both 2DD disks and 1.25 megabytes 2HD disks at 360 revolutions per minute, and 1.44 megabytes 2HD disks at 300 rpm. The host can determine which of the three different types of disks is loaded in the disk drive, on the basis of the medium identification data or the like which has been written on the disk on formatting. An objection to this known disk drive is that it requires the user to manipulate the mode select switch according to each specific type of disk he or she is going to use.

There are host systems that have three and a half inch disk drives built into them. Such inbuilt disk drives are so interfaced with the host that the latter delivers a signal indicative of whether the loaded disk is of 1.25 or 1.44 megabytes capacity, to the disk drive over a channel dedicated solely to that signal. The disk drive responds to this signal by rotating the disk at the required speed. However, as far as the applicant is aware, there has been no such dedicated channel between host systems and three and a half inch disk drives independent therefrom. Hence the need for the manual mode select switch.

Similar problems have been encountered with independent five and a quarter inch disk drives. The five and a quarter inch disks on the market are also divided into 2DD and 2HD types, with no physical difference whatever either between the disks themselves or between their envelopes. Conventionally, therefore, the host has discriminated between the two types from the medium identification data or the like read out from the loaded disk. The host has then signaled the result of the discrimination to the inbuilt disk drive, but has been incapable of doing so in cases where the disk drive is external thereto, because of the lack of a path for that signal.

Independent five and a quarter inch disk drives have also been developed which are equipped with a mode select switch for changing the filter constant of the read circuit and the magnitude of the write current according to which of the 2DD and 2HD disks is being used. This solution is unsatisfactory for the same reason as for the noted three and a half inch disk drive having the mode select switch.

It might be contemplated to remedy the foregoing problems with both three and a half inch and five and a quarter inch disk drives independent from hosts, by providing a dedicated mode select channel between host and disk drive. This remedy is impractical in view of too much additional manufacturing costs necessitated by the required interface means including the cable and the ports.

SUMMARY OF THE INVENTION

The present invention seeks to automatically adapt computer systems of the kind under consideration to two or more different types of data storage disks.

Briefly, the invention may be summarized as computer system capable of interchangeable use with a plurality of different types of data storage disks, comprising a disk drive in which any selected one of different types of data storage disks is to be loaded for data transfer therewith. Also included is a host system which is operatively coupled to the disk drive for supplying a set of standard control signals thereto in order to control its operation. The host system comprises disk type discriminator means for detecting each particular type of disk loaded in the disk drive, and for causing a selected one of the standard control signals to be produced in combination, as required, with at least one mode change command for setting up in the disk drive an operating mode suiting the particular type of disk loaded therein, the selected control signal and the mode change command being sent by multiplex transmission from the host system to the disk drive. The disk drive includes a mode detector circuit for detecting the mode change command sent from the host system and for setting up the required operating mode in the disk drive.

No dedicated channel is therefore required for transmission of the mode change command from the host system to the disk drive, so that a conventional interface may be employed without any modification between host and disk drive. Nor is it necessary to provide the disk drive with a mode select switch, the disk drive being switched from one operating mode to another fully automatically according to the type of disk loaded therein.

In one embodiment, which employs a stepper motor for positioning the transducer with respect to tracks on the disk, the mode change command is multiplexed with stepping pulses for incrementally driving the stepper motor. The mode change command takes the form of a series of stepping pulses the number of which is greater than that required for moving the transducer across all the tracks on any of the interchangeable disks. Another embodiment employs a read gate signal for carrying the mode change command in the form of a predetermined time delay imposed on the read gate signal in switching to a prescribed state.

Both stepping pulses and read gate signal are standard in computer systems of the kind under consideration, having their own channels for transmission from host to disk drive. Such preexisting channels can be used for transmission of a mode change command or commands, too.

The above and other features and advantages of this invention and the manner of realizing them will become more apparent, and the invention itself will best be understood, from a study of the following description and appended claims, with reference had to the attached drawings showing the preferred embodiments of the invention.

BRIEF DESCRIPTION OF THE DRAWINGS

FIG. 16 is a block diagram of a modified disk drive for use in the FIG. 12 computer system.

DESCRIPTION OF THE PREFERRED EMBODIMENTS

Figure 1:
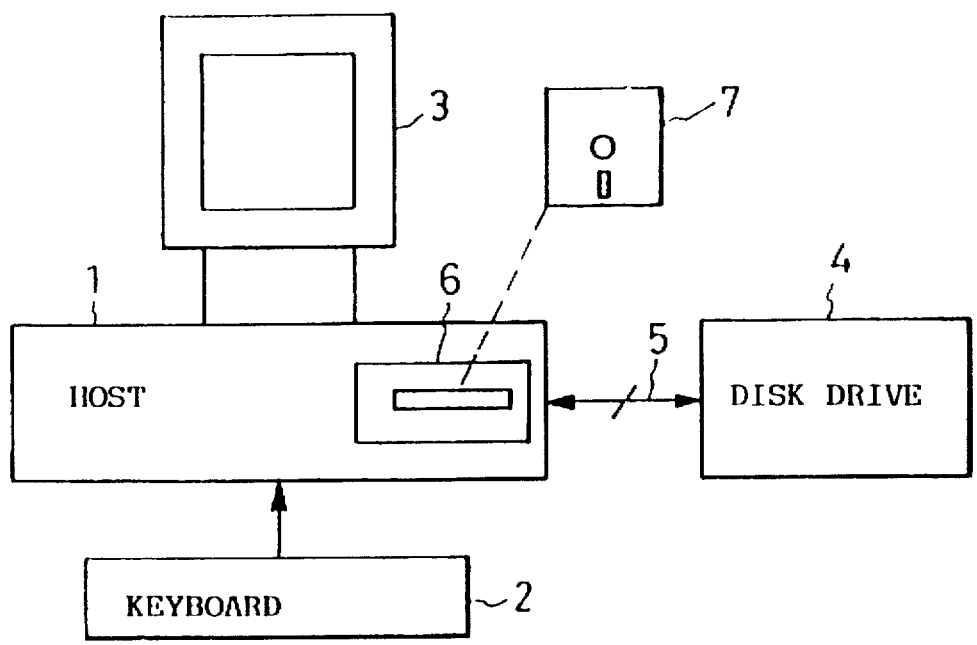
FIG. 1 is a combined pictorial and block diagrammatic representation of a typical computer system to which the present invention finds application.

The invention will now be described in detail as embodied in the small computer system depicted in FIG. 1. The representative computer system broadly comprises a host system 1, an input device shown as a keyboard 2, a display 3, and a peripheral data storage device shown as a floppy disk drive 4 which is external to the host 1 and which is coupled therewith via an interface cable 5. The external disk drive 4 is of triple mode construction capable of use with either of the 2DD disk, the 1.25 megabyte 2HD disk, and the 1.44 megabyte 2HD disk, all of three and a half inch diameter.

The host 1 has itself an inbuilt three and a half inch disk drive 6. One floppy disk 7, among other program and data disks, for use with the inbuilt disk drive 6 contains the program for automatic mode changes according to the invention, as well as a disk operating system such as, typically, MS-DOS developed by Microsoft Corp. for the NEC PC-9801 family of personal computers. Of course, the mode selection program and the MS-DOS may be stored on different disks.

Figure 2:
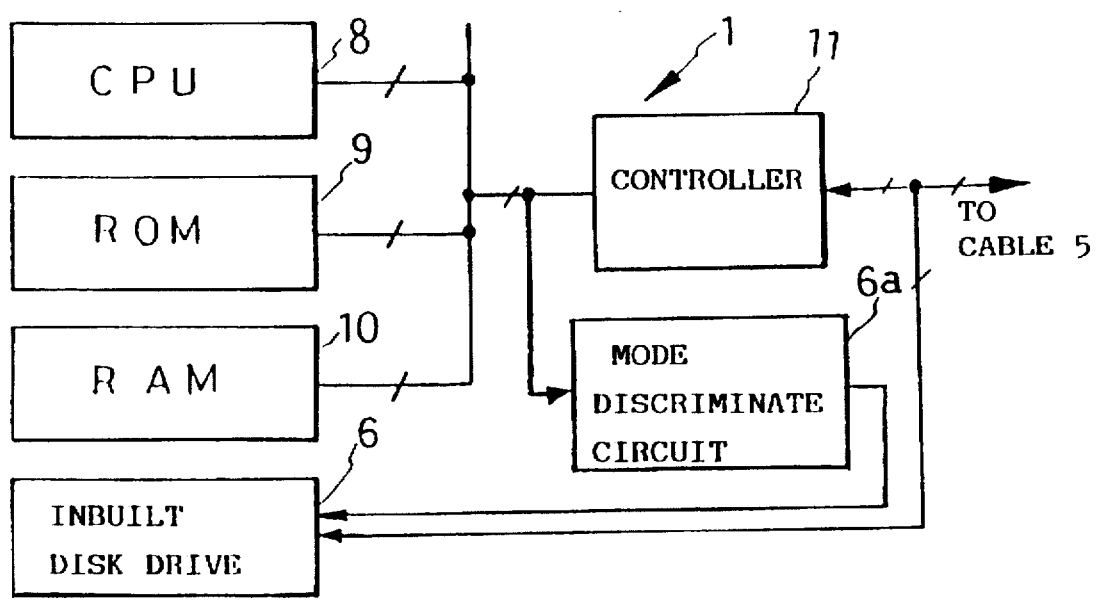
FIG. 2 is a block diagram showing in more detail the host system of the FIG. 1 computer system.

As schematically illustrated in FIG. 2, the host 1 comprises a central processor unit 8, read only memory 9, random access memory 10, disk drive controller 11, and mode discriminate circuit 6a, in addition to the inbuilt disk drive 6. It is understood that in use of the FIG. 1 computer system for the purposes of this invention, the disk 7 is to be loaded in the inbuilt disk drive 6 for transferring the MS-DOS and mode change program to the random access memory 10.

Figure 3:
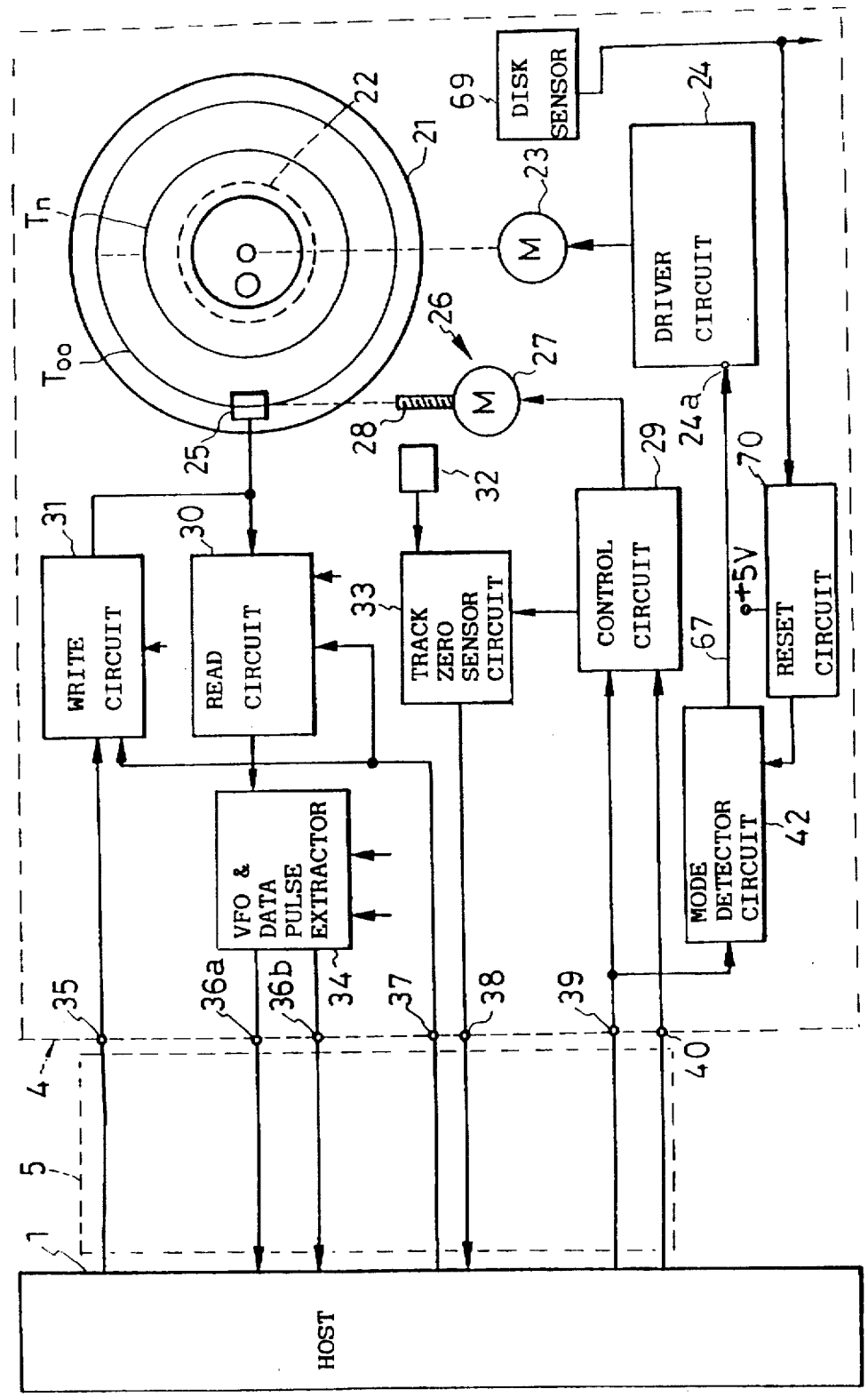
FIG. 3 is a combined pictorial and block diagrammatic representation of the details of the external disk drive of the FIG. 1 computer system.

Reference may be had to FIG. 3 for a more detailed study of the external triple mode disk drive 4. One floppy disk 21, which may be either of the three interchangeable types, is shown placed on a turntable 22 which is driven directly by an electric disk drive motor 23. A motor driver circuit 24 is so conventionally constructed that the disk drive motor 23 is thereby driven for rotation at either of 300 and 360 revolutions per minute. However, when a disk of any of the three types is first loaded on the turntable 22, the motor driver circuit 24 will cause the disk to rotate at a preselected one, 360 rpm in this particular embodiment, of the two different speeds at least until the disk proves to be of one type or another.

The disk 21 is shown to have a multiplicity of annular tracks formed concentrically thereon, from outmost Track Zero $T_{oo}$ to inmost Track n $T_n$. The 1.25 megabyte 2HD disk has 77 such tracks, and the 1.44 megabyte 2HD disk 80 such tracks. It is understood that whatever the type of the disk 21, the standard medium identification data is conventionally written on Track Zero $T_{oo}$ when the disk is formatted.

A pair of magnetic heads or transducers are provided for data transfer with the disk 21 on the turntable 22 if, as is mostly the case, the disk is double sided. Only one transducer is shown at 25, however, for simplicity of illustration and explanation. The transducer 25 is mechanically coupled to a positioning mechanism 26 of any known or suitable design thereby to be moved across the tracks on the disk 21. The positioning mechanism 26 is herein shown to comprise a positioning motor 27 of the known electrically bidirectionally stepping type and a lead screw 28 for translating the incremental rotation of the stepper motor into the linear stepwise travel of the transducer 25. The stepper motor 27 is controllably driven by a driver circuit 29.

Electrically, the transducer 25 is connected to both read circuit 30 and write circuit 31. The read circuit 30 recreates read pulses representative of information read back from the disk 21. Included in this read circuit is a wave filter, not shown, the constant of which is switched according to not only the radial position of the transducer 25 on the disk 21 but also the type of the disk in use. The write circuit 31 supplies to the transducer 25 a write signal representative of write data received from the host 1 through a write data input 35 of the disk drive 4. A standard DISK DRIVE signal is supplied from host 1 to both read circuit 30 and write circuit 31 via a disk drive input 37.

It is understood that the write circuit 31 is conventionally constructed to switch the magnitude of the write current according to the type of the disk in use. Such switching of the read circuit filter constant and the write current magnitude is performed automatically as a known HD sensor, not shown, discriminates between 2DD and 2HD disks on the basis of a difference between their envelopes. The filter constant and the write current magnitude are the same, however, for both 1.25 megabyte and 1.44 megabyte 2HD disks.

Connected to the output of the read circuit 30, a variable frequency oscillator and data pulse extractor circuit 34 generates a window signal for separating the incoming read pulses into data pulses and clock pulses. The data pulses and the window signal are sent to the host 1 via disk drive outputs 36a and 36b, respectively.

At 32 is shown a track zero sensor for optically sensing the fact that the head 25 is on Track Zero $T_{oo}$ on the disk 21. In practice the track zero sensor 32 can take the form of a combination of a photocoupler and a photointerrupter, the latter being movable with the head 25. The output from the track zero sensor 32 of such familiar construction is not totally reliable, some sensing errors being unavoidable. The sensor output is therefore directed into an electronic track zero sensor circuit 33, to which there is also supplied from the stepper motor driver circuit 29 a signal indicative of that phase of the stepper motor 27 which is to be energized when the head 25 is positioned on Track Zero. The sensor circuit 33 relies on both inputs for logically determining in a known manner that the head is on Track Zero. The output from the sensor circuit 33 is sent to the host 1 via a disk drive output 38.

The disk drive 4 is shown to have two other inputs 39 and 40 for inputting stepping pulses and a stepping direction signal from the host 1. Receiving these inputs, the stepper motor control circuit 29 conventionally functions to cause the stepper motor 27 to rotate a required number of steps in a required direction for positioning the head 25 on a required track on the disk 21.

The invention particularly features, as far as the disk drive 4 is concerned, a mode detector circuit 42 connected between the stepping pulse input 39 and a speed control input 24a of the disk drive motor driver circuit 24. The mode detector circuit 42 detects, on the basis of the stepping pulses supplied from the host 1, the operating mode required for each particular type of disk 21 that has been loaded in the disk drive 4, and determines the rotational speed of the disk drive motor 23 accordingly.

Figure 4:
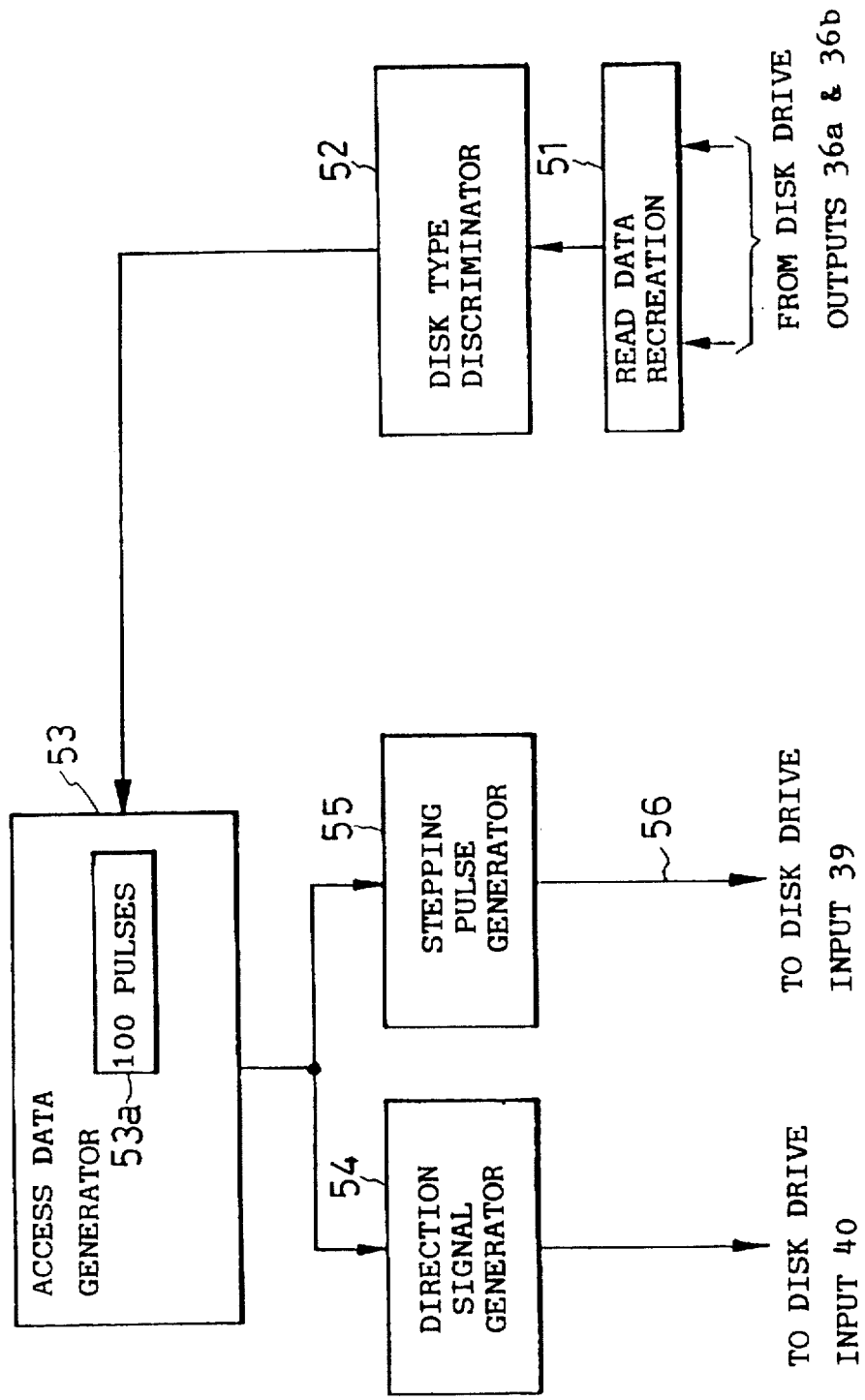
FIG. 4 is a block diagram schematically illustrating in particular how the host of the FIG. 1 computer system produces a mode change command multiplexed with stepping pulses for delivery to the disk drive.

Prior to the more detailed study of the mode detector circuit 42, however, let us consider how the host 1 determines the type of each loaded disk 21 and sets up the operating mode suiting that type of disk. As functionally diagramed in FIG. 4 purely for the purpose of illustration, the host 1 has means 51 connected to the data pulse output 36a and window signal output 36b of the disk drive 4 for demodulating the incoming serial data pulses into parallel data. Disk type discriminator means 52 determine the type of the disk from the recreated data.

Typically, for such disk type discrimination, the disk 21 of any of the three interchangeable types is first revolved at 360 rpm, and Track Zero of the disk is traced by the head 25 for reading the medium identification data thereon. The disk is of either the 2DD or the 1.25 megabyte 2HD type if the medium identification data is read and recreated successfully. If not, on the other hand, then the disk must be of the 1.44 megabyte 2HD type. The host will then command a change in the operating mode of the disk drive in the following manner.

The disk type discriminator means is sent to access data generator means 53 which conventionally provide data for positioning the head 25 on any destination track on the disk 21. Additionally, the means 53 include means 53a for generating a signal commanding the production of one hundred stepping pulses in succession in response to a mode change signal from the disk type discriminator means 52, that is, when the disk 21 is judged to be of the 1.44 megabyte 2HD type as above. The one hundred consecutive stepping pulses is used solely for the purpose of changing the rotational speed of the disk drive motor, and hence of the disk 21, according to the disk type in use, and not for driving the stepper motor 27, so that such pulses will be hereinafter referred to as the mode change pulses even though they are produced by the same circuit as the stepping pulses and have the same period therewith. More will be said presently about the mode change pulses.

Both stepping direction signal generator circuit 54 and stepping pulse generator circuit 55 are coupled to the access data generator means 53. The direction signal generator circuit 54 conventionally compares data indicative of a departure track, that is, the track on which the head is currently positioned, and the destination track data from the access data generator means 53 and puts out a stepping direction signal indicative of whether the head should be stepped radially inwardly or outwardly of the disk. The stepping direction signal is sent to the disk drive input 40, FIG. 3, and thence to the stepper motor driver circuit 29.

The stepping pulse generator circuit 55 can also be itself of conventional design, functioning primarily to provide that number of stepping pulses required for transporting the head from the departure to the destination track. The stepping pulses are directed to the disk drive input 39 and thence to the stepper motor driver circuit 29, as well as to the mode detector circuit 42. The head is understood to move one track with each stepping pulse in the illustrated embodiment, so that, for instance, 79 stepping pulses are generated periodically for moving the head from the inmost to the outmost track on a 1.44 megabyte 2HD disk.

Additionally, when commanded to generate the noted 100 mode change pulses in succession by the means 53a, the stepping pulse generator circuit 55 will do so for multiplex transmission with the stepping pulses to the disk drive 4; that is, the mode change pulses and the stepping pulses are sent over the same line 56 to the disk drive input 39 and thence to the mode detector circuit 42 and the stepper motor driver circuit 29. The admission of the mode change pulses into the stepper motor driver circuit 29 will present no problem at all, since they will be invalidated because their number, 100 in this embodiment, exceeds the total number of tracks on the disk 21 regardless of its type. The number 100 is thus chosen simply because it is greater than the greatest number, 80, of tracks on the three interchangeable types of disks. Other numbers may therefore be employed as desired provided that they meet the condition specified.

The admission of the stepping pulses into the mode detector circuit 42 will present no inconvenience, either. As will become apparent from the following description of FIG.

5, the mode detector circuit 42 does not respond to any series of pulses whose number falls short of the preselected number of each series of mode change pulses.

Figure 5:
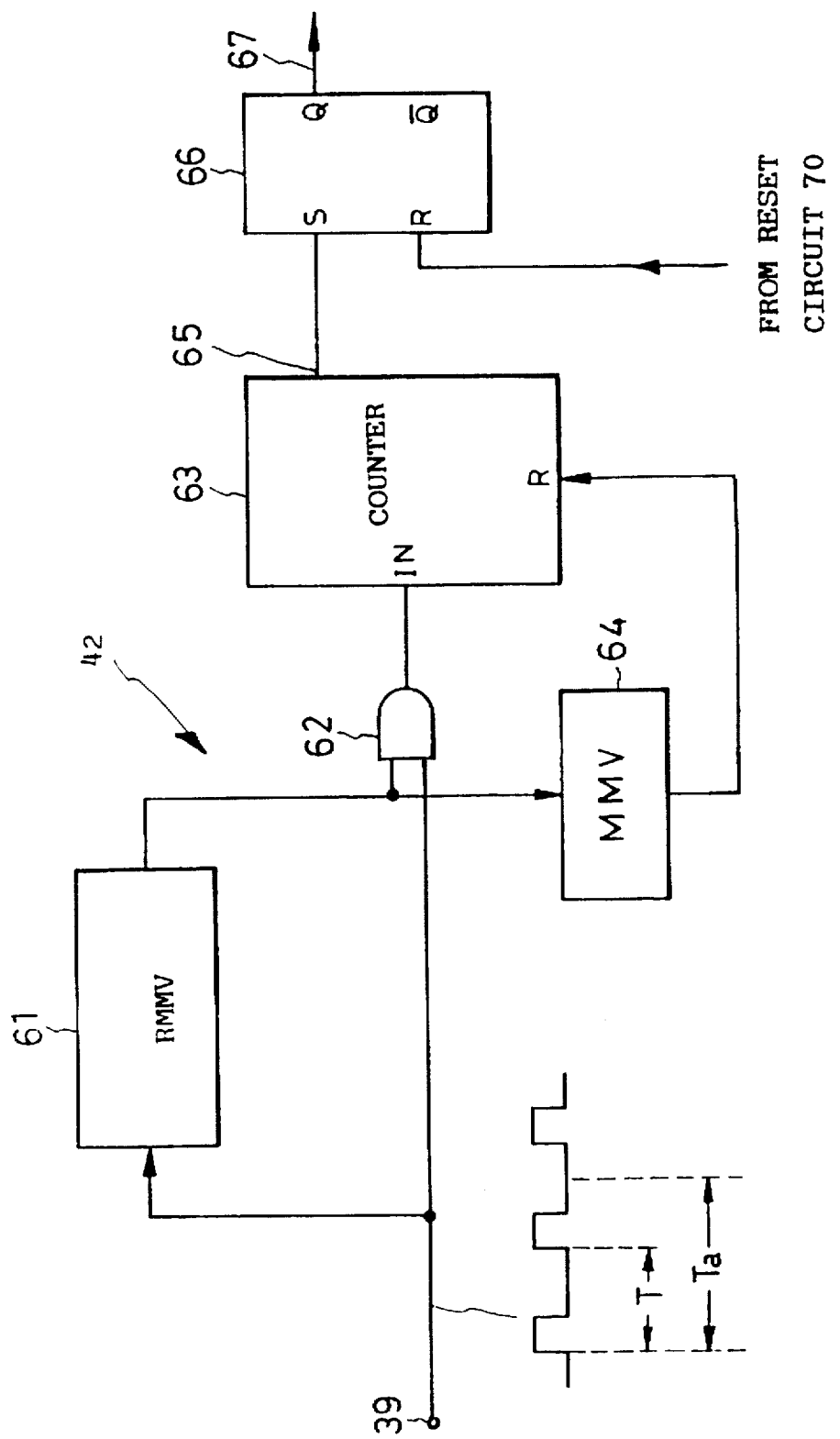
FIG. 5 is a block diagram showing in more detail the mode detector circuit included in the FIG. 3 disk drive.

Reference may now be had to FIG. 5 for more detailed discussion of the mode detector circuit 42, which is connected as aforesaid between disk drive input 39 and disk drive motor driver circuit 24. Such discussion will be better understood by referring to FIG. 6 as well, which shows waveforms appearing in various parts of the mode detector circuit 42.

Figure 6:
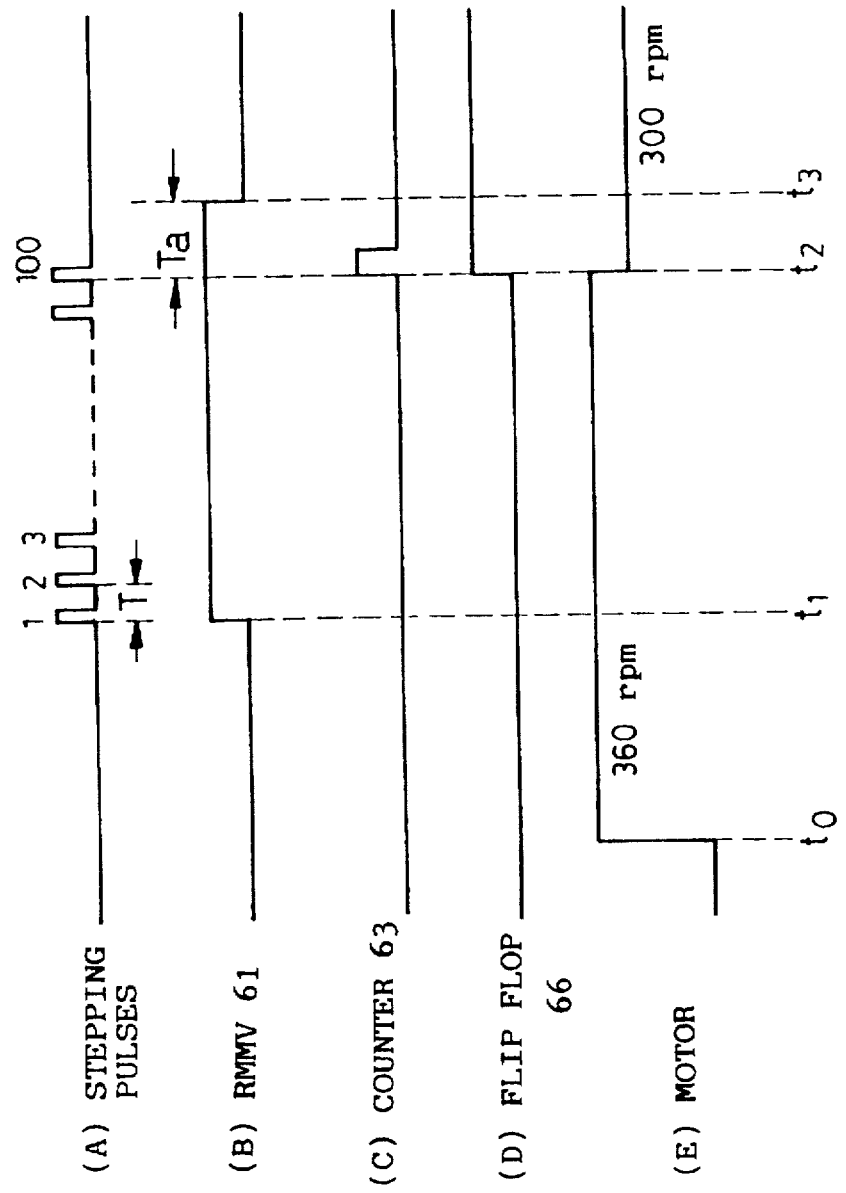
FIG. 6, consisting of (A) through (E), shows waveforms useful in explaining the operation of the FIG. 5 mode detector circuit.

Included in the mode detector circuit 42 is a retriggerable monostable multivibrator (RMMV) 61 which is connected to the disk drive input 39 in order to determine where the mode change pulses, as well as the stepping pulses, are being supplied in succession with a constant period T, as at (A) in FIG. 6. The RMMV 61 will go high when triggered by each incoming pulse and remain so for a preassigned length of time $T_a$, FIG. 6(B), which is longer than the mode change pulse, as well as stepping pulse, period T. Consequently, when triggered by the 100 mode change pulses in succession, the RMMV 61 will go high at time $t_1$ in response to the first of such pulses and go low at time $t_3$ upon lapse of the preassigned time $T_n$ following the rise, at time $t_2$, of the last of such pulses.

The output of the RMMV is connected to one input of an AND gate 62, the other input of which is connected directly to the disk drive input 39. All the mode change pulses are therefore permitted to pass through the AND gate 62 as long as the RMMV 61 is high.

The mode change pulses that have passed through the AND gate 62 are directed to the input IN of a counter 63 thereby to be counted. This counter has a reset input R which is connected to an MMV 64 and thence to the RMMV 61. Triggered by the leading edge of each output pulse of the RMMV 61, the MMV 64 puts out a pulse of shorter duration than that of each mode change pulse. Thus the counter 63 will be reset, for example, at the time $t_1$ in FIG. 6 and start counting the mode change pulses. The counter 63 is so constructed as to provide a pulse, as at (C) in FIG. 6, on its output 65 only when it has counted the mode change pulses up to 100. Stepping pulses for track seeking will be produced in succession only to the maximum number of 79 in the illustrated embodiment, so that the series of 100 mode change pulses is positively distinguishable from stepping pulses for use as a mode change command.

The output of the counter 63 is connected to the set input S of a flip flop 66, which has a reset input R connected to an initializing or reset circuit 70, FIG. 3, and a Q output connected to the disk drive motor driver circuit 24 by way of a line 67. Connected to a disk sensor 69, a standard component of disk drives of this class, the reset circuit 70 provides a reset signal when a disk is loaded on the turntable 22, as well as when the complete computer system is electrically turned on.

Thus, as indicated at (D) in FIG. 6, the flip flop 66 is low until the counter 63 puts out the pulse at the time $t_2$. This low output conditions the driver circuit 24 to drive the disk drive motor 23 for disk rotation at 360 rpm, as from time $t_o$ to time $t_2$ at (E) in FIG. 6. The driver circuit 24 is conditioned for disk rotation at 300 rpm when the flip flop 66 goes high in response to the output pulse of the counter 63.

Operation

The disk drive motor 23 is in constant rotation as long as a disk is positioned on the turntable 22 and the computer system is being powered. Assume that either a formatted 2DD disk or a formatted 1.25 megabyte 2HD disk has now been loaded in the disk drive 4. Since then the disk will rotate at the proper speed of 360 rpm, as has been set forth with reference to FIG. 6 in particular, the medium identification data on Track Zero of the disk will be read by the head 25 when the host 1 commands the disk drive 4 to trace that track. Then the loaded disk will be identified as that of either the 2DD or 1.25 megabyte 2HD type by the disk type discriminator means 52, FIG. 4. No change is required in this case in the rotational speed of the disk, warranting immediate commencement of data transfer with the disk.

If a formatted 1.44 megabyte 2HD disk is loaded, on the other hand, then the medium identification data will be unrecoverable therefrom as the disk is initially revolved at 360 rpm in this case, too. The disk type discriminator means 52 will then determine, on the basis of the nonrecovery of medium identification data, that the disk is of the 1.44 megabyte 2HD type, and inform the access data generator means 53 to that effect. Then the means 53a included in the access data generator means 53 will cause the stepping pulse generator circuit 55 to produce 100 mode change pulses in succession, for delivery to the mode detector circuit 42 shown in FIG. 3 and in more detail in FIG. 5. Then the mode detector circuit 42 will respond by causing the driver circuit 24 to drive the disk drive motor 23, and therefore the 1.44 megabyte 2HD disk on the turntable 22, at the required speed of 300 rpm, as has been explained in connection with FIGS. 5 and 6.

Thus has been accomplished a change from one disk speed to another. It will be appreciated that the invention requires neither a manual mode select switch nor a special interface cable between host 1 and disk drive 4. An existing interface can therefore be employed for providing a more versatile computer system than heretofore.

Second Form

The invention is applicable to a computer system having an independent disk drive for use with 5.25 inch floppy disks. Such disks on the market today are divided as aforesaid into 2DD and 2HD. These two types do not usually require different disk speeds for reading or writing, but do demands different write current levels and different filter constants in the read circuit.

Figure 7:
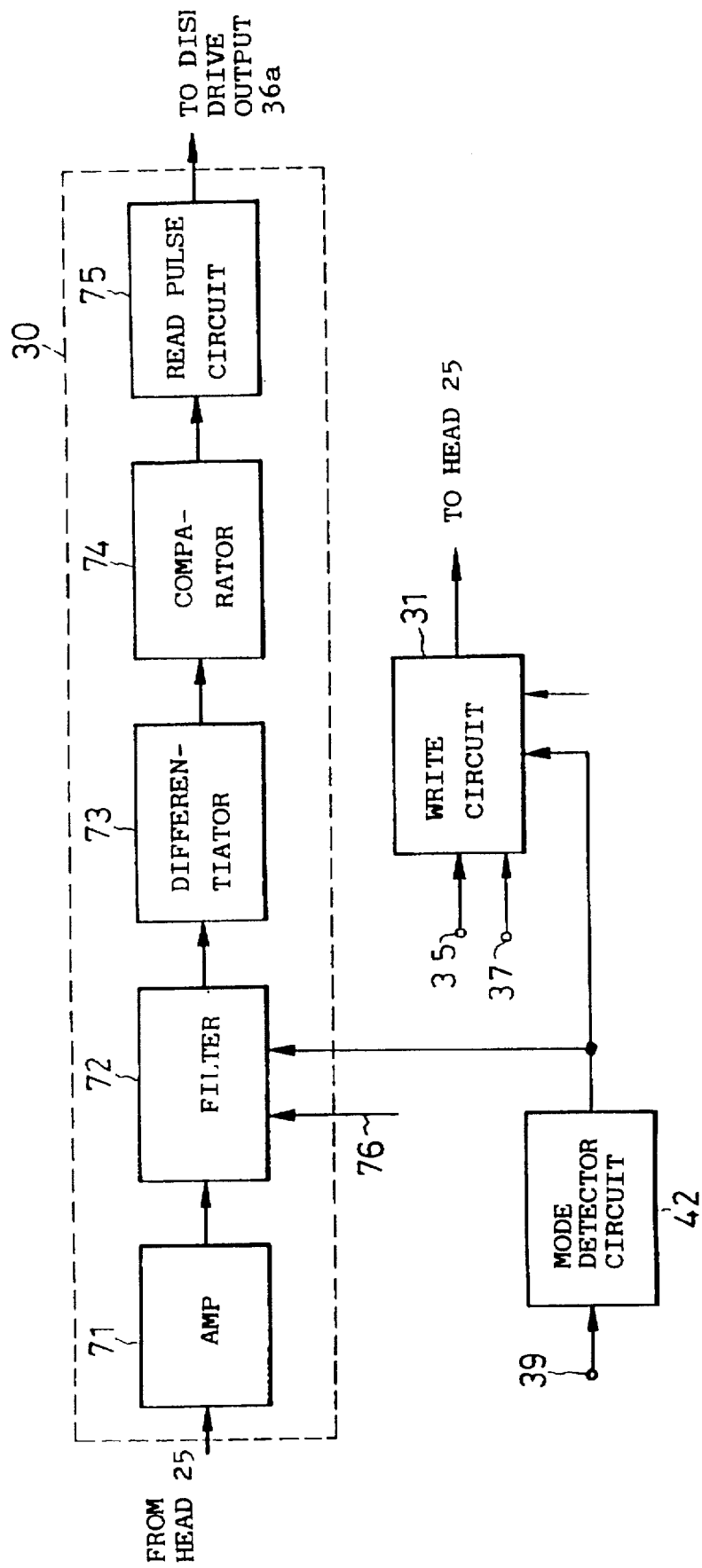
FIG. 7 is a block diagram showing part of a modified disk drive for use in the FIG. 1 computer system in substitution for the FIG. 3 disk drive.

FIG. 7 illustrates only those parts of such a 5.25 inch disk drive which are essential for the understanding of the invention. The illustrated disk drive may be employed in substitution for the 3.5 inch disk drive 4 in the computer system of FIG. 1.

It will be noted that the mode detector circuit 42 of the FIG. 7 disk drive is connected to both read circuit 30 and write circuit 31, instead of to the disk drive motor driver circuit 24 as in the 3.5 inch disk drive 4 of FIG. 3. The mode detector circuit 42 can be of the same configuration as shown in FIG. 5.

The read circuit 30 is itself of the familiar construction comprising an amplifier 71, filter 72, differentiator 73, comparator 74, and read pulse circuit 75, which are connected serially in that order. Functioning to amend the amplified output waveform of the head 25 Into a form suitable for application to the differentiator 73, the filter 72 is so conventionally constructed as to permit its filter constant changed as dictated by a signal, which is supplied over a line 76, indicative of whether the head is positioned radially inwardly or outwardly of the disk. Additionally, the filter 72 responds to the output from the mode detector circuit 42 to provide a different filter constant according to whether the disk is 2DD or 2HD. The magnitude of the write current is also varied according to the type of disk in use.

Operation of Second Form

Discrimination between the 2DD and 2HD types of 5.25 inch disks is possible by essentially the same method as that of discriminating between the 2DD or 1.25 megabyte 2HD type and 1.44 megabyte 2HD type of 3.5 inch disks. The mode detector circuit 42 of the FIG. 7 disk drive may be so made as to provide a 2HD mode signal, for example, both when the complete computer system is powered on and when a disk of either type is inserted in the disk drive. The disk type discriminator means 52, FIG. 4, of the host will then be able to recognize the medium identification data when a 2HD disk is loaded.

When a 2DD disk is loaded, on the other hand, the medium identification data will be unrecoverable, from which fact the disk type discriminator means will discern the loaded disk as the 2DD. Then, as has been explained with reference to FIG. 4 in connection with the 3.5 inch disk drive, the stepping pulse generator circuit 55 will be caused to produce 100 mode change pulses in succession. The mode detector circuit 42 will respond to the mode change pulses by signaling both the filter 72 of the read circuit 30 and the write circuit 31 to change the filter constant and the write current magnitude accordingly.

Third Form

Figure 8:
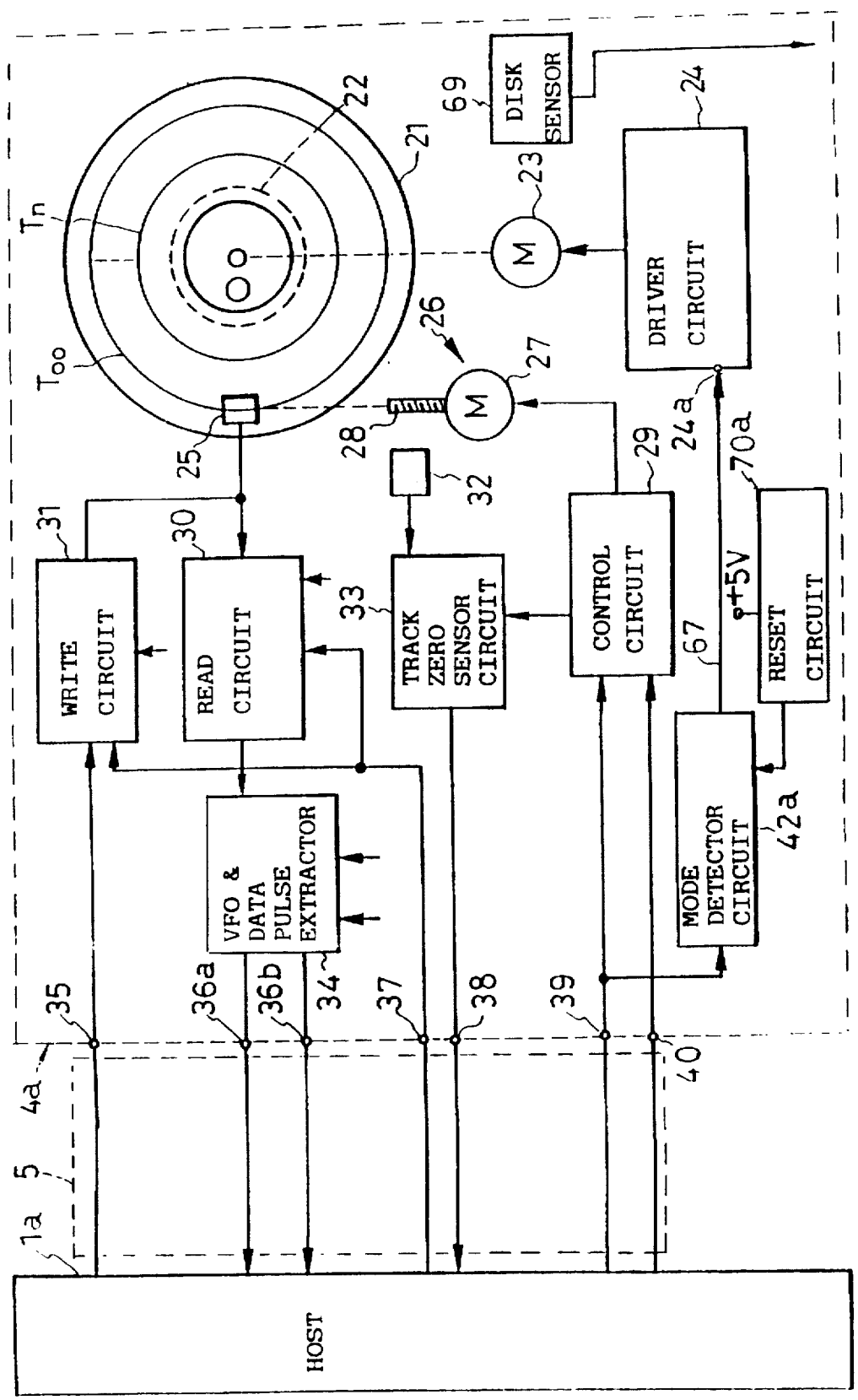
FIG. 8 is an illustration similar to FIG. 3 but directed to another preferred embodiment of the invention.
Figure 9:
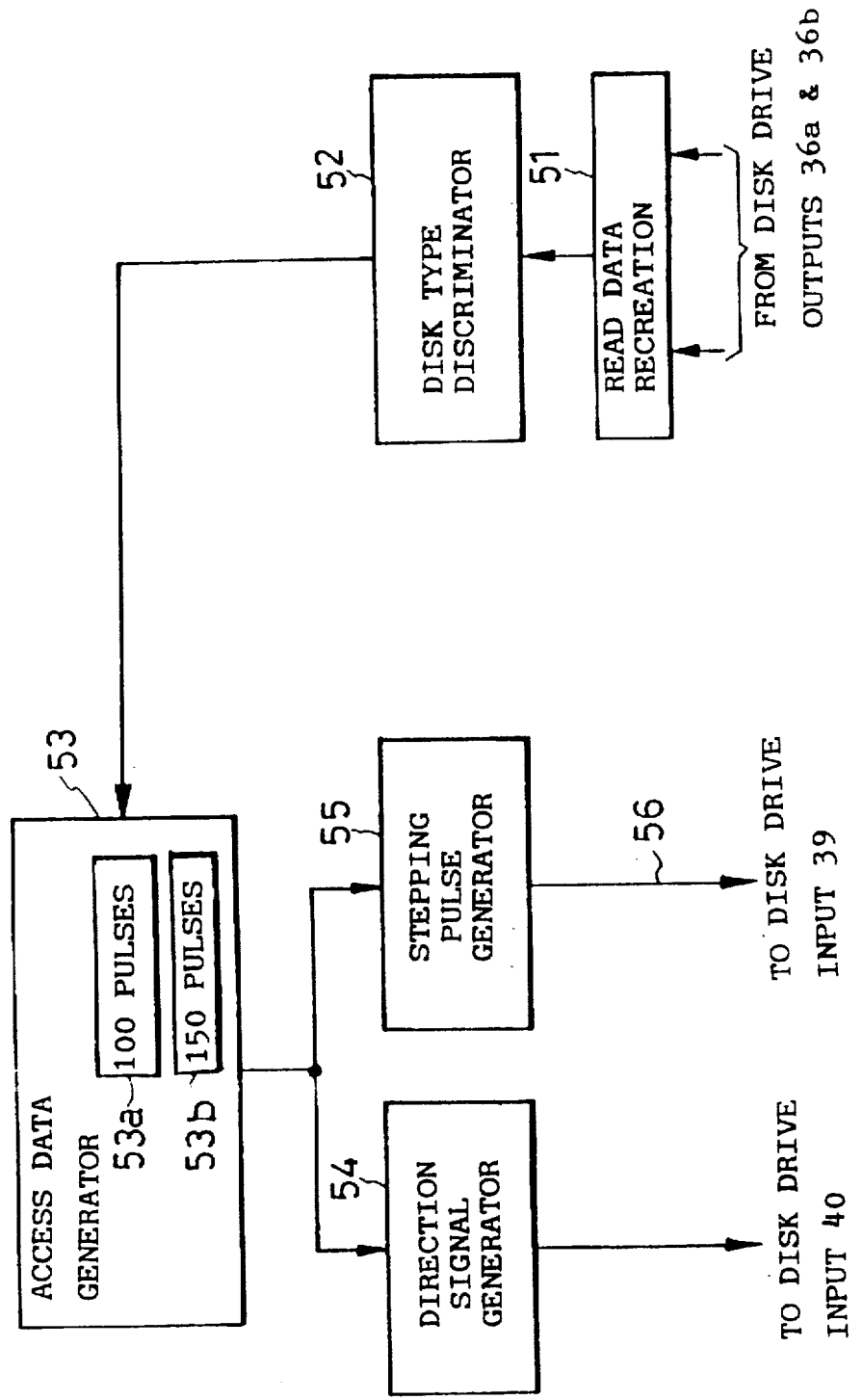
FIG. 9 is a block diagram schematically illustrating in particular how the host of the FIG. 8 computer system produces two mode change commands multiplexed with stepping pulses.
Figure 10:
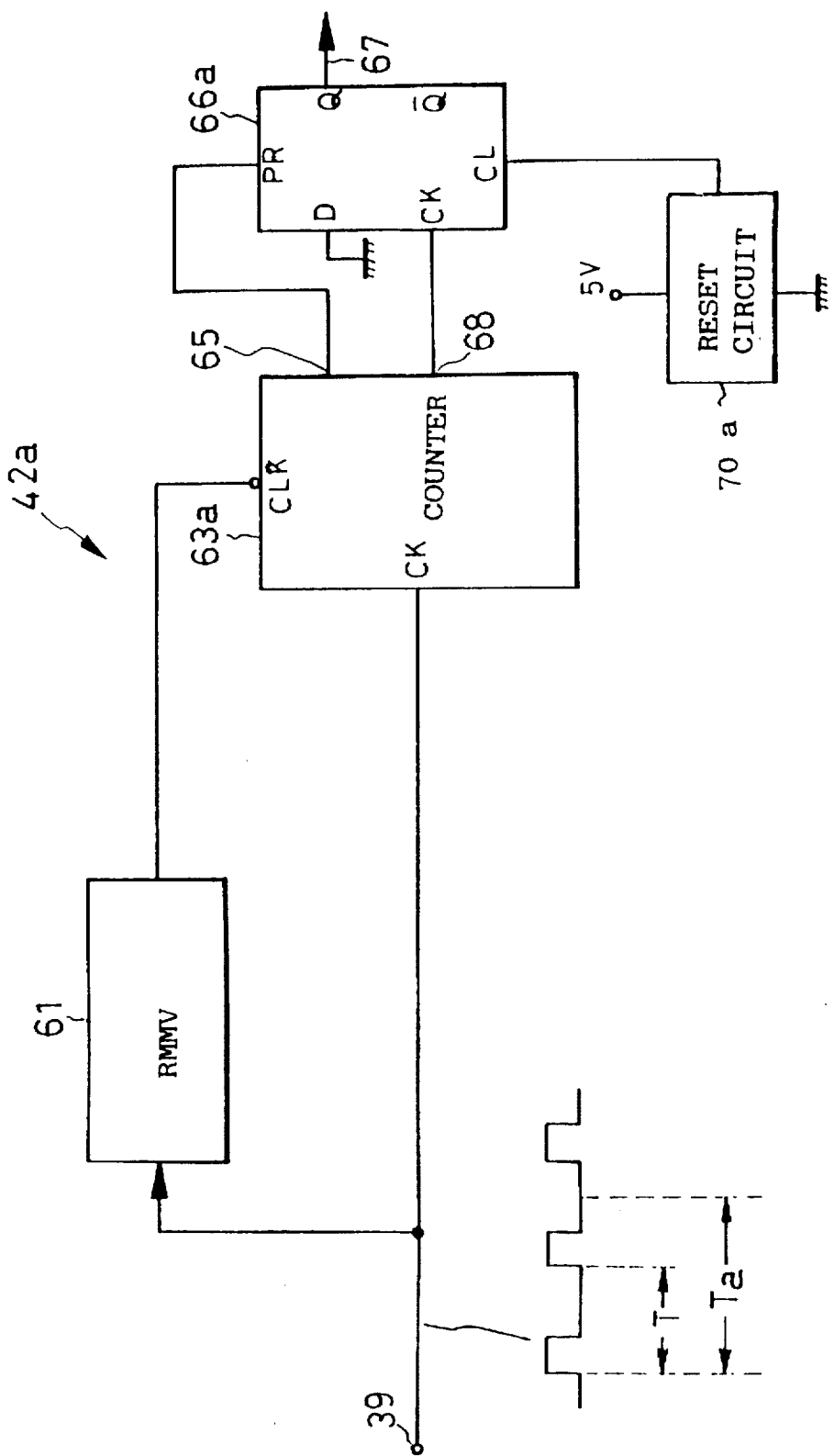
FIG. 10 is a block diagram showing in more detail the mode detector circuit included in the FIG. 8 disk drive.

FIGS. 8–10 show another triple mode computer system suitable for use with 2DD, 1.25 megabyte 2HD, and 1.44 megabyte 2HD disks of 3.5 inch diameter. As will be noted from FIG. 8, which shows a modified external disk drive 4a, a mode detector circuit 42a included in this disk drive is not initialized by a reset circuit 70a when a disk is loaded, the reset circuit being not connected to the disk sensor 69, but only when the computer system is switched on. The rotational speed of the disk drive motor 23 is therefore undetermined when a change is made from one disk to another.

Instead, as diagramed in FIG. 9, the host 1a for use with the disk drive 4a has the access data generator means 53 including not only the 100 pulse mode change means 53a but also 150 pulse mode change means 53b. The 100 pulse mode change means 53a function as in the FIGS. 1–6 embodiment to cause the stepping pulse generator means 55 to produce a series of 100 mode change pulses to command disk rotation at 300 rpm. Similarly, the 150 pulse mode change means function to cause the stepping pulse generator circuit 55 to produce a series of 150 mode change pulses by way of another mode change command for disk rotation at 360 rpm. Both series of mode change pulses are sent to the disk drive 4a by multiplex transmission with the stepping pulses. The host 1a is similar to the host 1 in the other details of construction and operation.

As shown in detail in FIG. 10, the mode detector circuit 42a of the disk drive 4a includes the RMMV 61 connected between the pulse input 39 and the clear input CLR of a counter 63a. This counter has a clock input CK connected directly to the pulse input 39 for counting the mode change, as well as stepping, pulses. The counter 63a has the first output 65 for producing a pulse on counting each series of 100 mode change pulses, and a second output 68 for producing a pulse on counting each series of 150 mode change pulses. The counter outputs 65 and 68 are connected to the preset input PR and clock input CK, respectively, of a D flip flop 66a. Additionally, the flip flop 66a has a data input D grounded, a clear input CLR connected to the reset circuit 70a, and a Q output connected to the disk drive motor driver circuit 24 by way of the line 67.

Operation of Third Form

The flip flop 66a will be reset by the reset circuit 70a when the computer system is turned on. The Q output of the flip flop will therefore be low, causing the driver circuit 24 to drive the disk drive motor 23 for disk rotation at, say, 360 rpm. If the medium identification data is subsequently recovered from the disk 21 revolving at that speed, that is, if the disk is either 2DD or 1.25 megabyte 2HD, then the host 1a will determine that the current disk speed is good for the disk. No change will then be made in the speed of the disk drive motor 23.

However, no medium identification data will be recoverable if the disk is 1.44 megabyte 2HD. Then the 100 pulse mode change means 53a, FIG. 9, of the host 1a will cause the stepping pulse generator means 55 to produce 100 mode change pulses at the constant period T, as from time $t_1$ to time $t_2$ at (A) in FIG. 11. The RMMV 61, FIG. 10, of the mode detector circuit 42a will enable the counter 63a to count the mode change pulses from $t_1$ to $t_3$, the latter being the moment spaced Ta from $t_2$, as at (B) in FIG. 11. The counter 63a will produce a pulse from its first output 65 at $t_2$, as at (C) in FIG. 11, upon counting the 100 mode change pulses. With this pulse applied to the preset input PR of the flip flop 66a, its Q output will go high at $t_2$, as at (E) in FIG. 11. Then the driver circuit 24 will cause the disk drive motor 23 to rotate the disk at the proper 1.44 megabyte 2HD disk speed of 300 rpm. The medium identification data will now be read back from the disk.

Figure 11:
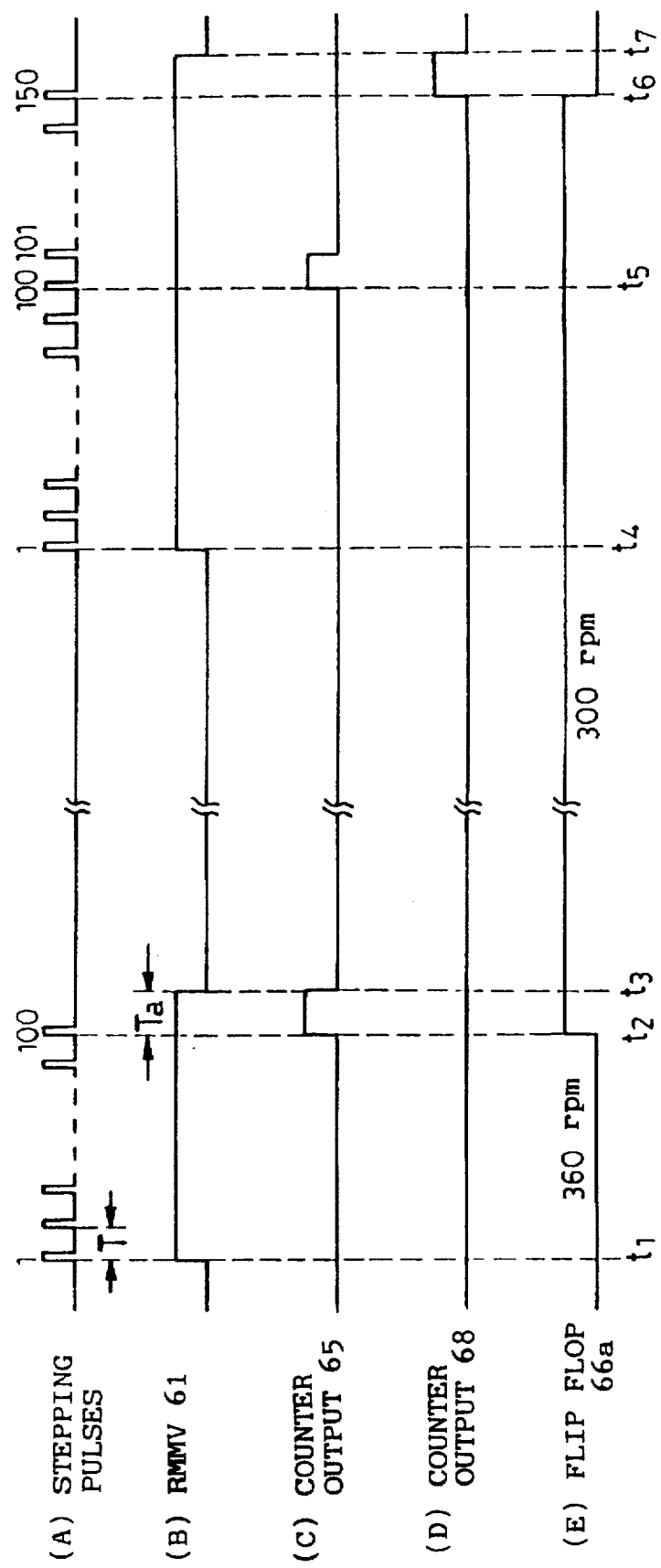
FIG. 11, consisting of (A) through (E), shows waveforms useful in explaining the operation of the FIG. 10 mode detector circuit.

Assume that either 2DD or 1.25 megabyte 2HD disk has been inserted in the disk drive 4a in place of the 1.44 megabyte 2HD disk before time $t_4$ in FIG. 11. The medium identification data will be initially unrecoverable from the new disk because the disk speed remains 300 rpm. Then, in response to a mode change command from the disk type discriminator means 52, FIG. 9, the 150 pulse mode change means 53b will cause the stepping pulse generator means to produce 150 mode change pulses in succession, as from $t_4$ to $t_6$ at (A) in FIG. 11.

Counting the 150 mode change pulses, the counter 63a will produce a pulse from its second output 68, as from $t_6$ to $t_7$ at (D) in FIG. 11, for application to the clock input CK of the flip flop 66a. The Q output of this flip flop will then go low at $t_6$, as at (E) in FIG. 11, its D input being grounded. Then the disk speed will rise to 360 rpm again, so that medium identification data will be read back from the 2DD or 1.25 megabyte 2HD disk which has been assumed to be now loaded in the disk drive 4a.

Fourth Form

Figure 12:
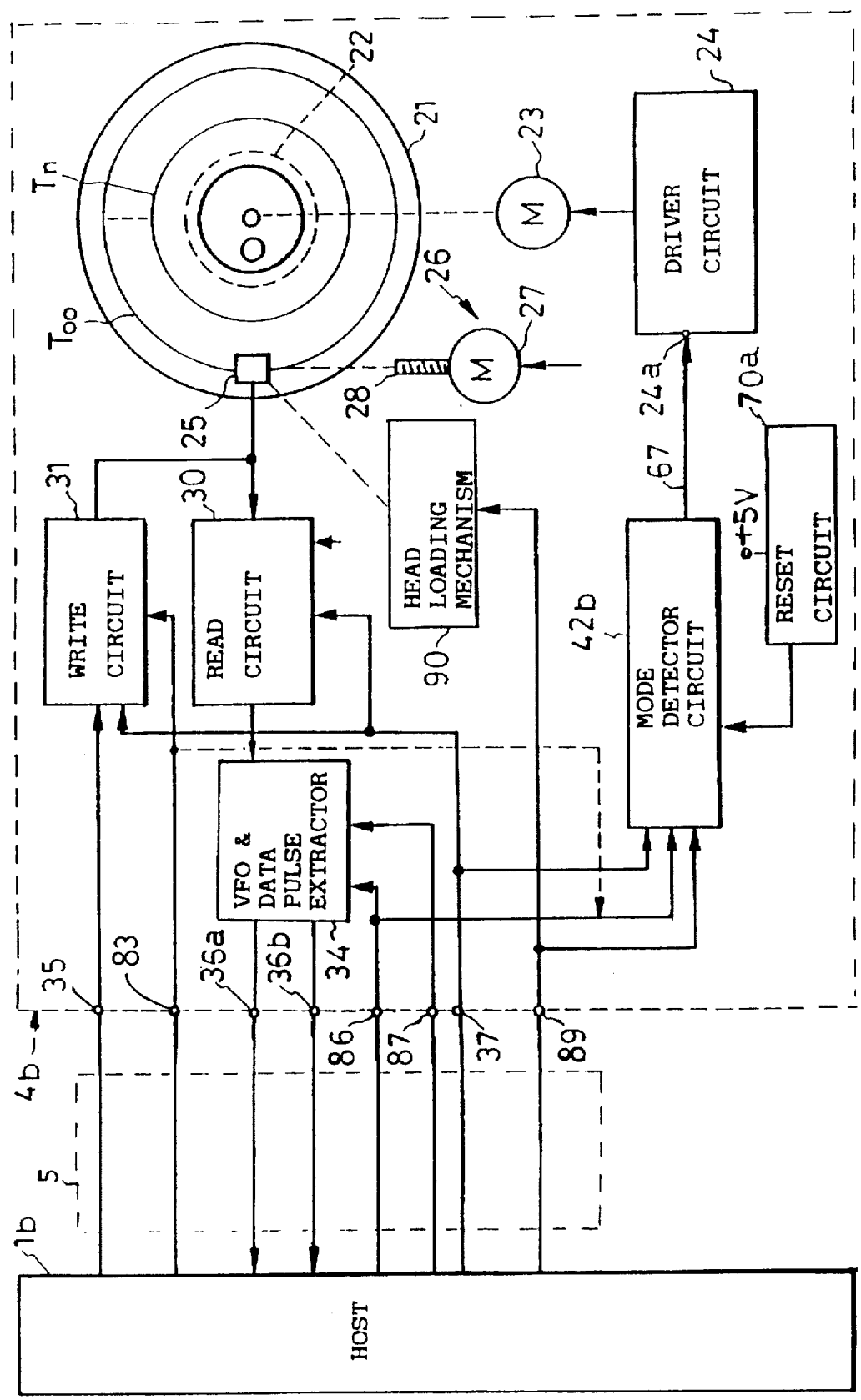
FIG. 12 is an illustration similar to FIGS. 3 and 8 but directed to still another preferred embodiment of the invention.

FIG. 12 illustrates still another triple mode computer system for use with 2DD, 1.25 megabyte 2HD, and 1.44 megabyte 2HD disks of 3.5 inch diameter. This embodiment employs a standard READ GATE signal, instead of stepping pulses as in the foregoing embodiment, for multiplex transmission of mode change commands from host to disk drive.

The FIG. 12 computer system comprises a host system 1b and an external disk drive 4b which are coupled together via the interface cable 5. The host 1b is similar in general configuration to the FIG. 2 host 1 except for minor modifications depicted in FIG. 13. The disk drive 4b is also substantially analogous with the FIG. 3 disk drive 4 except that the FIG. 5 mode detector circuit 42 of the latter is modified as shown in FIG. 14, the modified mode detector circuit being labeled 42b.

However, in FIG. 12, the disk drive 4b is shown without the stepper motor driver circuit 29, Track Zero sensor 32, Track Zero detector circuit 33, inputs 38, 39 and 40, and disk sensor 69, all seen in FIG. 3, because of their impertinence to this particular embodiment of the invention. The disk drive 4b is shown complete, instead, with a WRITE GATE input 83, READ GATE input 86, MFM/FM (Modified Frequency Modulation/Frequency Modulation) mode select input 87, HEAD LOAD input 89, and head loading mechanism 90.

Referring more specifically to FIG. 12, the write circuit 31 is shown connected to the DRIVE SELECT input 37 and WRITE GATE input 83 for sending a write signal to the head 25 only when enabled by the DRIVE SELECT and WRITE GATE signals from the host 1b. It is understood that the write circuit 31 is so constructed as to provide a write current of different magnitude according to the type of disk in use.

The VFO and data pulse extractor circuit 34 is shown connected to both READ GATE input 86 and MFM/FM mode select input 87. The READ GATE input 86 receives from the host 1b the READ GATE signal indicative of periods during which reading is permitted. The VFO and data pulse extractor circuit 34 is constructed to provide different circuit constants according to whether the read signal is to be processed by MFM or FM mode.

The head loading mechanism 90 can be of any known or suitable make capable of loading the head 25 against the disk 21. Connected to the HEAD LOAD input 89, the mechanism 90 does so in response to the HEAD LOAD signal from the host 1b.

The mode detector circuit 42b is shown connected to the DRIVE SELECT input 37, READ GATE input 86, and HEAD LOAD input 89. Reset by the reset circuit 70a when the computer system is turned on, the mode detector circuit 42b signals the disk drive motor driver circuit 24 to cause disk rotation at an initial speed of 360 rpm. The disk drive motor 23 starts rotation when the system is switched on and, at the same time, when a disk is inserted in the disk drive.

Figure 13:
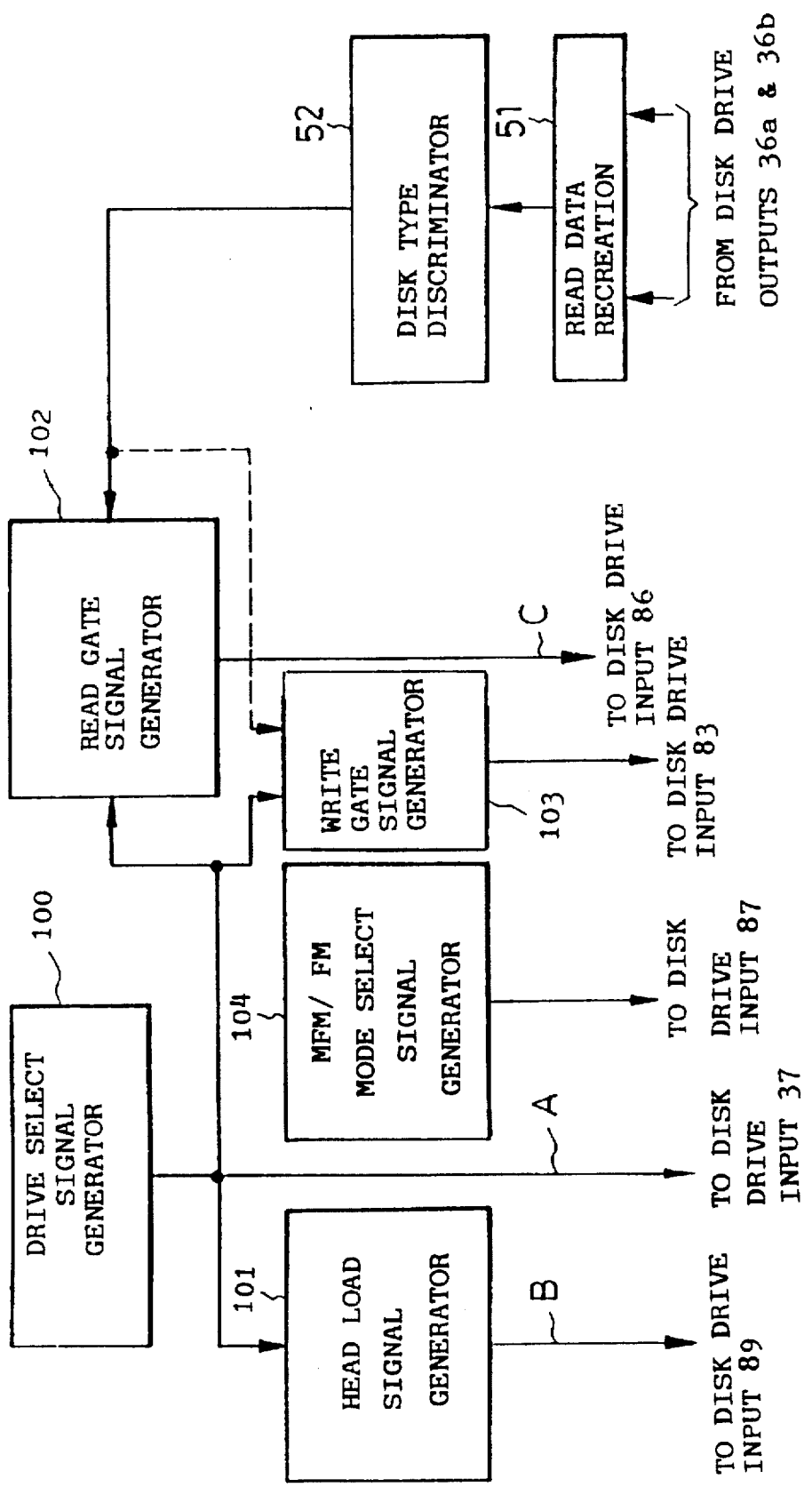
FIG. 13 is a block diagram schematically illustrating in particular how the host of the FIG. 12 computer system produces mode change commands multiplexed with a standard read gate signal.
Figure 14:
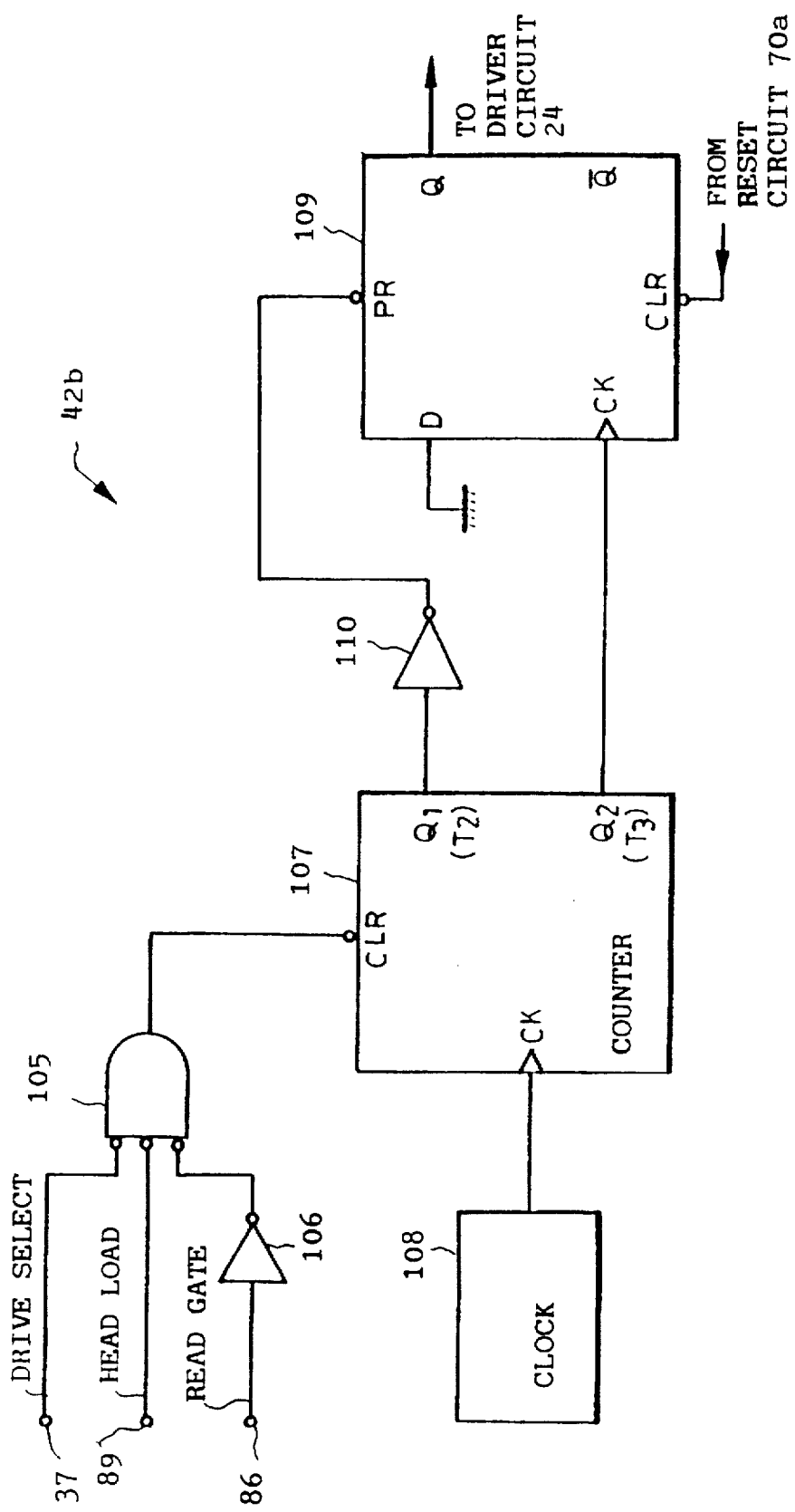
FIG. 14 is a block diagram showing in more detail the mode detector circuit included in the FIG. 12 disk drive.
Figure 15:
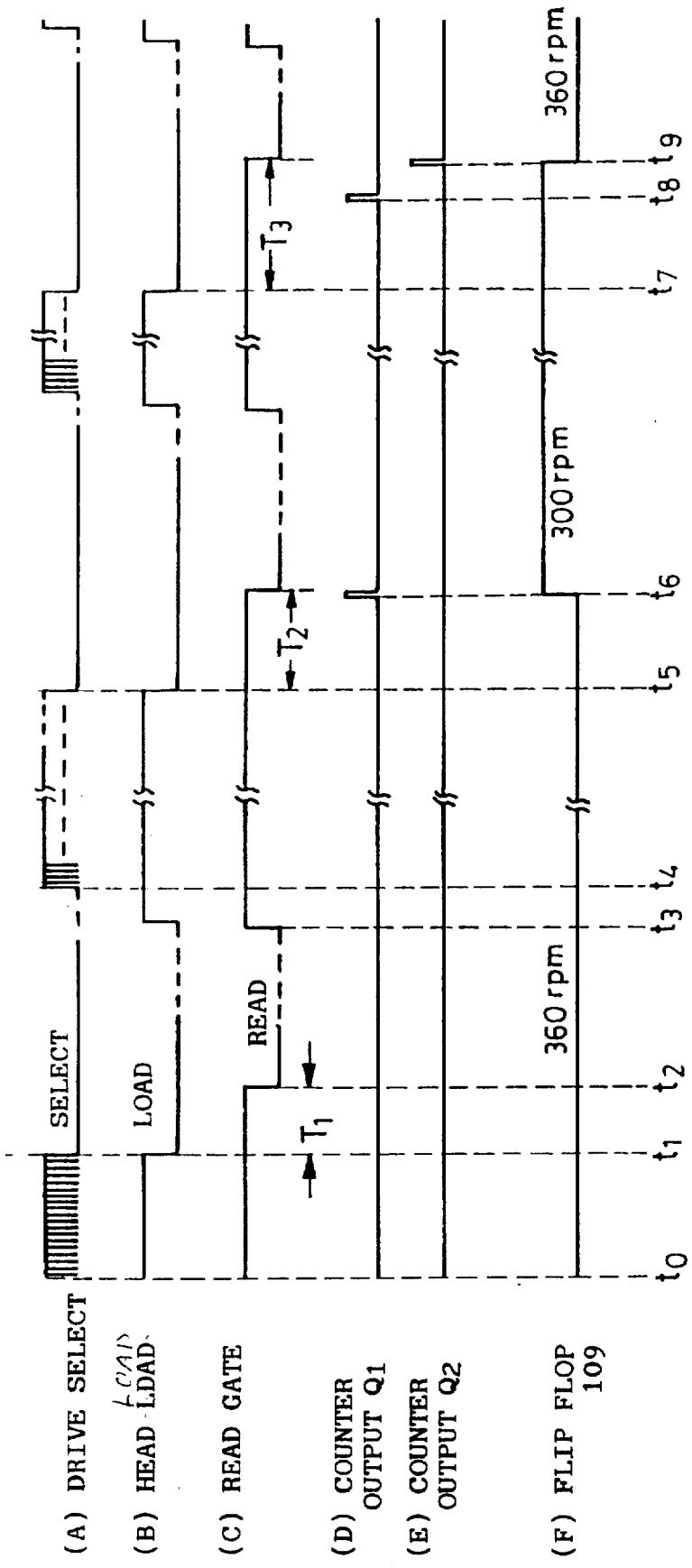
FIG. 15, consisting of (A) through (F), shows waveforms useful in explaining the operation of the FIG. 14 mode detector circuit.

The host 1b for use with the disk drive 4b of the foregoing construction includes the means revealed in FIG. 13. DRIVE SELECT signal generator means 100 produces the DRIVE SELECT signal which, as shown at (A) in FIG. 15, has a low state indicative of the selection of the particular disk drive 4b for data transfer with the disk, and a high state indicative of the nonselection of the disk drive. The term "high state" is used expediently for the DRIVE SELECT signal, because this signal is not constantly high in its normal state in computer systems of this kind but alternates between the two levels at very short intervals, as indicated in FIG. 15, for what is known as "drive scan" of all the disk drives connected to the host 1b. For the purposes of the invention, however, the DRIVE SELECT signal should be considered normally high, or in one constant state.

Inputting the DRIVE SELECT signal, HEAD LOAD signal generator means 101 provides the HEAD LOAD signal seen at (B) in FIG. 15. Normally high, the HEAD LOAD signal goes low, commanding head loading against the disk, at the same time with the transitions, as at times $t_1$, $t_5$ and $t_7$, of the DRIVE SELECT signal from the high to the low state.

Also connected to the DRIVE SELECT signal generator means 100, READ GATE signal generator means 102 puts out the READ GATE signal in combination with mode change commands for multiplex transmission to the disk drive 4b. As shown at (C) in FIG. 15, the READ GATE signal is also normally high and goes low, to enable reading, upon lapse of either of three different delay periods $T_1$, $T_2$ and $T_3$ following the transitions of the DRIVE SELECT signal from the high to the low state. The first delay period $T_1$ represents the standard head loading time, that is, the time from the HEAD LOAD signal goes low to the moment the head becomes loaded against the disk and stabilized thereon. The second delay period $T_2$, longer than the first $T_1$, represents the head loading time plus a mode change command for changing disk speed from 360 to 300 rpm. The third delay period $T_3$, still longer than the second $T_2$, represents the head loading time plus another mode change command for changing disk speed from 300 to 360 rpm. The READ GATE signal generator means 102 choose either of the delay periods $T_1$-$T_3$ in response to the signal from the disk type discriminator means 52.

Generally, the delay periods $T_1$-$T_3$ may be determined at different values ranging from zero to 254 milliseconds. $T_1$ is set at 50 milliseconds, $T_2$ at 150 milliseconds, and $T_3$ at 200 milliseconds, in this particular embodiment.

The host 1b further includes WRITE GATE signal generator means 103 which, in response to the DRIVE SELECT and other signals, provide the WRITE GATE signal indicative of periods during which writing is permitted on the disk 21. An MFM/FM MODE SELECT signal is generated by means 104 to indicate whether the data on the disk 21 is MFM or FM encoded.

With reference to FIG. 14 the mode detector circuit 42b of the FIG. 12 disk drive 4b includes a NOR gate 105 having a first input connected to the DRIVE SELECT input 37, a second input to the HEAD LOAD input 89, and a third input to the READ GATE input 86 via a NOT circuit 106. In FIG. 15 both DRIVE SELECT and HEAD LOAD signals are shown to go low at $t_1$, for example, whereas the READ GATE signal is shown to go low at $t_2$, or upon lapse of the first delay period $T_1$ after $t_1$. All the three inputs of the NOR gate 105 are therefore low from $t_1$ to $t_2$, so that the output of the NOR gate is high during this period, as well as from $t_5$ to $t_6$ and $t_7$ to $t_9$. The READ GATE signal is shown going high at $t_3$ and the DRIVE SELECT signal is shown going high at $t_4$.

A counter 107 has a clear input CLR connected to the NOR gate 105, and a clock input CK to a clock 108, a standard component of disk drives. Enabled by the high output from the NOR gate 105, the counter 107 counts the clock pulses and produces a pulse from its first output $Q_1$ on counting them for the second delay period $T_2$, as at (D) in FIG. 15, and from its second output $Q_2$ on counting them for the third delay period $T_3$, as at (E) in FIG. 15.

The first counter output $Q_1$ is connected to the preset input PR of a D flip flop 109 via a NOT circuit 110, and the second counter output $Q_2$ to the clock input CK of the flip flop. This flip flop further has a data input D grounded, a clear input CLR connected to the reset circuit 70a, FIG. 12, and a Q output connected to the disk drive motor driver circuit 24.

Operation of Fourth Form

The flip flop 109 of the mode detector circuit 42b will be cleared by the reset circuit 70a when the computer system is switched on at $t_o$ in FIG. 15. The resulting low output from the flip flop 109 will cause disk rotation at a preselected initial speed of 360 rpm, as at (F) in FIG. 15.

As has been mentioned, the counter 107 of the mode detector circuit 42b will start counting the clock pulses at $t_1$ when both DRIVE SELECT and HEAD LOAD signals go low as at (A) and (B) in FIG. 15. Then, upon lapse of the first delay period T₁, the counter 107 will be cleared at t₂ without producing a pulse this time. Consequently, the flip flop 109 will remain low, as at (F) in FIG. 15, holding the disk speed at 360 rpm.

However, during the first delay period T₁, which is equivalent to the standard head loading time, the head 25 will be loaded against the disk 21 and stabilized thereon. Further the head will be positioned on Track Zero on the disk by the conventional recalibration procedure taking place when the power switch is turned on. The medium identification data will be recovered from the disk as the head attempts to read Track Zero after t₂, if the disk is either 2DD or 1.25 megabyte 2HD. No change in disk speed is then necessary.

No medium identification data will be recovered, however, if the disk is 1.44 megabyte 2HD. In this case the READ GATE signal generator means 102, FIG. 13, of the host 1b will respond to the output from the disk type discriminator means 52 by causing the READ GATE signal to go low, as at t₆, upon lapse of the second delay period T₂ after both DRIVE SELECT and HEAD LOAD signals go low at t₅. That is to say that the READ GATE signal is multiplexed this time with the mode change command for disk rotation at 300 rpm. The counter 107, FIG. 14, of the mode detector circuit 42b will start counting the clock pulses at t₅ and produce a pulse from its first output $Q_1$ at t₆, as at (D) in FIG. 15. Activated by the inversion of this pulse, the flip flop 109 will go high, as at (F) in FIG. 15, to cause disk rotation at 300 rpm. The medium identification data will then be recovered from the 1.44 megabyte 2HD disk.

Assume that the 1.44 megabyte 2HD disk is replaced by a 2DD or 1.25 megabyte 2HD disk before t₇ in FIG. 15. Identification data will initially be unrecoverable from the new disk because disk speed will remain set at 300 rpm since t₆. Then, signaled by the disk type discriminator means 52 to that effect, the READ GATE signal generator means 102 will make the READ GATE signal go low, as at t₉, upon lapse of the third delay period T₃ after both DRIVE SELECT and HEAD LOAD signals go low at t₇, thereby multiplexing the READ GATE signal with the mode change command for disk rotation at 360 rpm.

The counter 107 of the FIG. 14 mode detector circuit 42b will start counting the clock pulses at t₇ and produce a pulse from its first output $Q_1$ at t₈ upon lapse of the second delay period T₂, as at (D) in FIG. 15. However, having been preset at t₆, the flip flop 109 will not be affected by this counter output pulse at t₈. The counter 107 will produce another pulse at t₉ upon lapse of the third delay period T₃, this time from its second output $Q_2$, as at (E) in FIG. 15. Clocked by this pulse, the flip flop 109 will go low at t₉, as at (F) in FIG. 15, its data input being grounded. The disk drive motor driver circuit 24, FIG. 12, will respond to this low flip flop output by causing disk rotation at 360 rpm. The medium identification data will now be recovered from the 2DD or 1.25 megabyte 2HD disk revolving at 360 rpm.

Fifth Form

The teachings of the FIGS. 12–15 embodiment are applicable to a computer system having a disk drive for use with 5.25 inch floppy disks of both 2DD and 2HD. As has been mentioned with reference to FIG. 7, the two disk types require different write current levels and different filter constants in the read circuit, but not different disk speeds.

Thus, in FIG. 16, the mode detector circuit 42b of the preceding embodiment is shown to have its output connected only to the filter 72 of the read circuit 30 and to the write circuit 31. The constructions of the read circuit 30 and write circuit 31 are as previously explained with reference to FIG. 7. The other details of construction of the complete computer system are as set forth above in connection with the FIGS. 12–15 embodiment.

It is therefore apparent that the mode detector circuit 42b ascertains the mode change commands sent from the host by multiplex transmission with the READ GATE signal in association with the DRIVE SELECT and HEAD LOAD signals. Then the mode detector circuit 42b will signal the filter circuit 72 of the read circuit 30 and the write circuit 31 to change the filter constant and the write current magnitude according to which of the commands is received.

Possible Modifications

Although the present invention has been shown and described in terms of several preferred forms thereof, it is not desired that the invention be limited by the exact showing of the drawings or the description thereof. The following, then, is a brief list of possible modifications, alterations, substitutions, and adaptations of the invention which are all believed to fall within the scope of the invention:

1. The invention may be applied as necessary to the switching of disk drive parameters other than disk speed, filter constant, and write current magnitude according to the type of disk in use.

2. The teachings of the FIGS. 8–11 embodiment could be applied to systems for use with five and a quarter inch disks as well.

3. The reset circuit 70a of the FIGS. 12–16 embodiments could be connected to the disk sensor in order that the disk on being inserted in the disk drive might be invariably driven at a preselected initial speed of, say, 360 rpm.

4. Mode change commands could be multiplexed with the WRITE GATE signal, instead of with the READ GATE signal, in the FIGS. 12–16 embodiments. For this alteration one of the inputs of the mode detector circuit 42b may be connected to the WRITE GATE input 83, instead of to the READ GATE input 86, as indicated by the broken line in FIG. 12, and the disk type discriminator means 52 of the host 1b may be connected to the WRITE GATE signal generator means 103, as indicated by the broken line in FIG. 13. The term "data transfer gate signal" used in the appended claims should be construed to mean either READ GATE or WRITE GATE signal.

5. The teachings of the FIGS. 12–16 embodiments are applicable to disk drives in which the head is loaded immediately against the inserted disk, rather than in response to the HEAD LOAD signal. This signal will then be utilized only for mode change purposes in combination with the READ GATE, or WRITE GATE, signal according to the invention. Many hosts are equipped to produce the HEAD LOAD signal for compatibility with disk drives of both types.

6. The HEAD LOAD input 89 could be disconnected from the NOR gate 105 of the FIG. 14 mode detector circuit 42b, since the READ GATE, or WRITE GATE, signal could carry the mode change commands only in association with the DRIVE SELECT signal.

7. The DRIVE SELECT input 37 could be disconnected from the NOR gate 105 of the FIG. 14 mode detector circuit 42b, since the READ GATE, or WRITE GATE, signal could carry the mode change commands only in association with the HEAD LOAD signal.

What is claimed is:

1. A computer system capable of interchangeable use with a plurality of different types of data storage disks, comprising:

(A) a disk drive in which any selected one of different types of data storage disks is to be loaded for data transfer therewith; each disk having a known number of annular tracks thereon, the disk drive comprising:
  (a) a transducer for data transfer with a disk loaded in the disk drive;
  (b) means including a stepper motor for moving the transducer from track to track on the disk; and
  (c) a driver circuit connected to the stepper motor for driving the stepper motor in response to stepping pulses; and (B) a host system operatively coupled to the disk drive for controlling the disk drive, the host system comprising:
  (a) disk type discriminator means for detecting each particular type of disk loaded in the disk drive;
  (b) stepping pulse generator means for generating the stepping pulses; and
  (c) mode change means connected between the disk type discriminator means and the stepping pulse generator means for causing the stepping pulse generator means to produce, as required, a predetermined number of consecutive stepping pulses by way of a mode change command for setting up in the disk drive an operating mode suiting the particular type of disk loaded therein, the predetermined number being greater than a number of stepping pulses required for moving the transducer across all the tracks on any of the interchangeable types of disks; and (C) a mode detector circuit included in the disk drive for detecting the mode change command included in the stepping pulses sent from the host system and for setting up the required operating mode in the disk drive, the mode detector circuit comprising:
  (a) a counter for counting the stepping pulses, the counter producing a pulse upon counting the predetermined number of consecutive stepping pulses; and
  (b) a bistable circuit connected to the counter, the bistable circuit being normally held in one stable state and switched into another stable state by the output pulse of the counter;

whereby no channel other than one for the stepping pulses is required for transmission of the mode change command from the host system to the disk drive.

2. The computer system of claim 1 further comprising:

a disk sensor for sensing the loading of a disk in the disk drive; and a reset circuit connected between the disk sensor and the bistable circuit for resetting the bistable circuit when a disk is loaded in the disk drive and when the computer system is electrically turned on.

3. A computer system capable of interchangeable use with a plurality of different types of data storage disks, comprising:

(A) a disk drive in which any selected one of different types of data storage disks is to be loaded for data transfer therewith, each disk having a known number of annular tracks thereon, the disk drive comprising:
  (a) a transducer for data transfer with a disk loaded in the disk drive;
  (b) means including a stepper motor for moving the transducer from track to track on the disk; and
  (c) a driver circuit connected to the stepper motor for driving the stepper motor in response to stepping pulses; and (B) a host system operatively coupled to the disk drive for controlling the disk drive, the host system comprising:
  (a) disk type discriminator means for detecting each particular type of disk loaded in the disk drive;
  (b) stepping pulse generator means for generating the stepping pulses; and
  (c) mode change means connected between the disk type discriminator means and the stepping pulse generator means for causing the stepping pulse generator means to produce, as required, a first predetermined number of consecutive stepping pulses by way of a mode change command for setting up in the disk drive an operating mode suiting a particular type of disk loaded therein, and a second predetermined number of consecutive stepping pulses by way of a second mode change command for setting up in the disk drive a different operating mode suiting another particular type of disk loaded therein, the first predetermined number being greater than a number of stepping pulses required for moving the transducer across all the tracks on any of the interchangeable types of disks, and the second predetermined number being greater than the first predetermined number;

(C) a mode detector circuit included in the disk drive for detecting the mode change commands included in the stepping pulses sent from the host system and for setting up the required operating mode in the disk drive, the mode detector circuit comprising:
  (a) a counter for counting the stepping pulses, the counter having a first output for producing a first pulse upon counting the first predetermined number of consecutive stepping pulses, and a second output for producing a second pulse upon counting the second predetermined number of consecutive stepping pulses; and
  (b) a bistable circuit having a first input connected to the first output of the counter in order to be switched into one stable state in response to the first output pulse of the counter, and a second input connected to the second output of the counter in order to be switched into another stable state in response to the second output pulse of the counter;

whereby no channel other than one for the stepping pulses is required for transmission of the mode change command from the host system to the disk drive.

4. The computer system of claim 3 further comprising a reset circuit connected to the bistable circuit for resetting the bistable circuit when the computer system is electrically turned on.

* * * * *